J. M. WILSON.
BALING PRESS.
APPLICATION FILED OCT. 4, 1910.

1,038,255.

Patented Sept. 10, 1912.

3 SHEETS—SHEET 1.

Witnesses:
R. E. Hamilton
E. E. Lillian

Inventor,
J. M. Wilson,
By F. G. Fischer,
Atty.

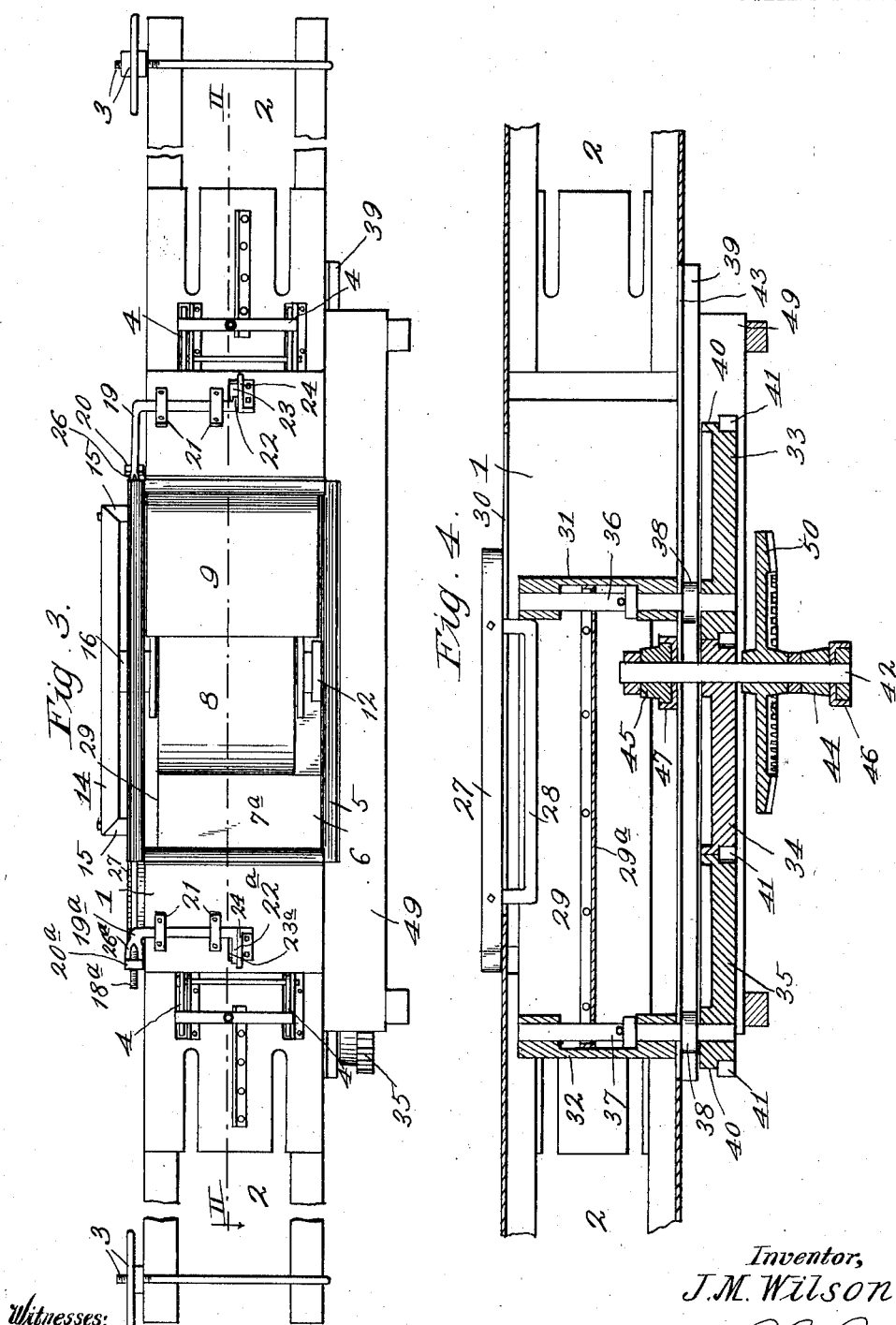

J. M. WILSON.
BALING PRESS.
APPLICATION FILED OCT. 4, 1910.
1,038,255.
Patented Sept. 10, 1912.
3 SHEETS—SHEET 3.
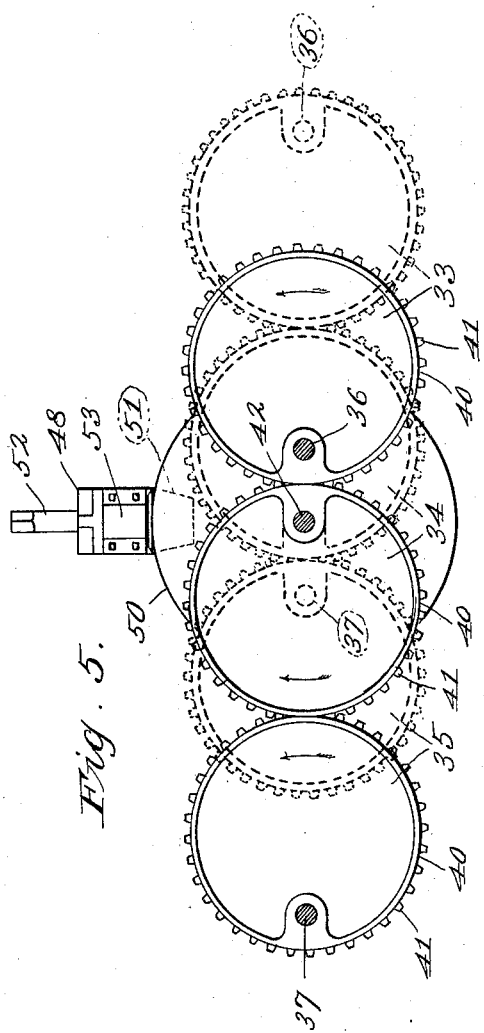
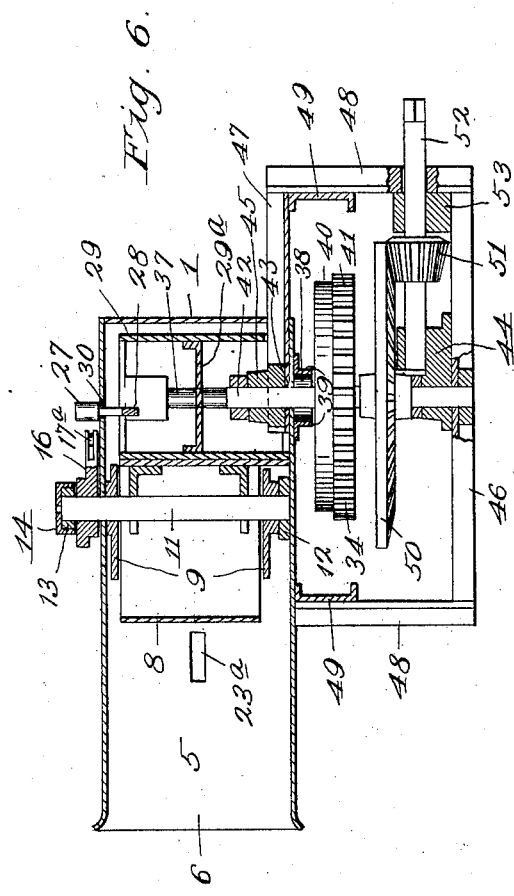
Witnesses:
R. E. Hamilton
E. C. Lillian
Inventor,
J. M. Wilson,
By F. G. Fischer,
Atty.

UNITED STATES PATENT OFFICE.

JOHN M. WILSON, OF WICHITA, KANSAS, ASSIGNOR OF ONE-HALF TO JOHN NORMAN, OF WICHITA, KANSAS.

BALING-PRESS.

1,038,255.

Specification of Letters Patent.

Patented Sept. 10, 1912.

Application filed October 4, 1910. Serial No. 585,331.

*To all whom it may concern:*

Be it known that I, JOHN M. WILSON, a citizen of the United States, residing at Wichita, in the county of Sedgwick and State of Kansas, have invented certain new and useful Improvements in Baling-Presses, of which the following is a specification.

My invention relates to double-acting baling-presses, and my objects are to provide a simple, compact, light-running press which can be operated to advantage either by engine or horse-power.

A further object is to drive the plunger of the press by positive rotary means, so that it can not stick at the end of a stroke, or rebound and thereby rack or break the press.

Another object is to locate the feed-opening of the press relatively close to the ground, so that the charges of material being fed therein can not be blown away.

Figure 1:
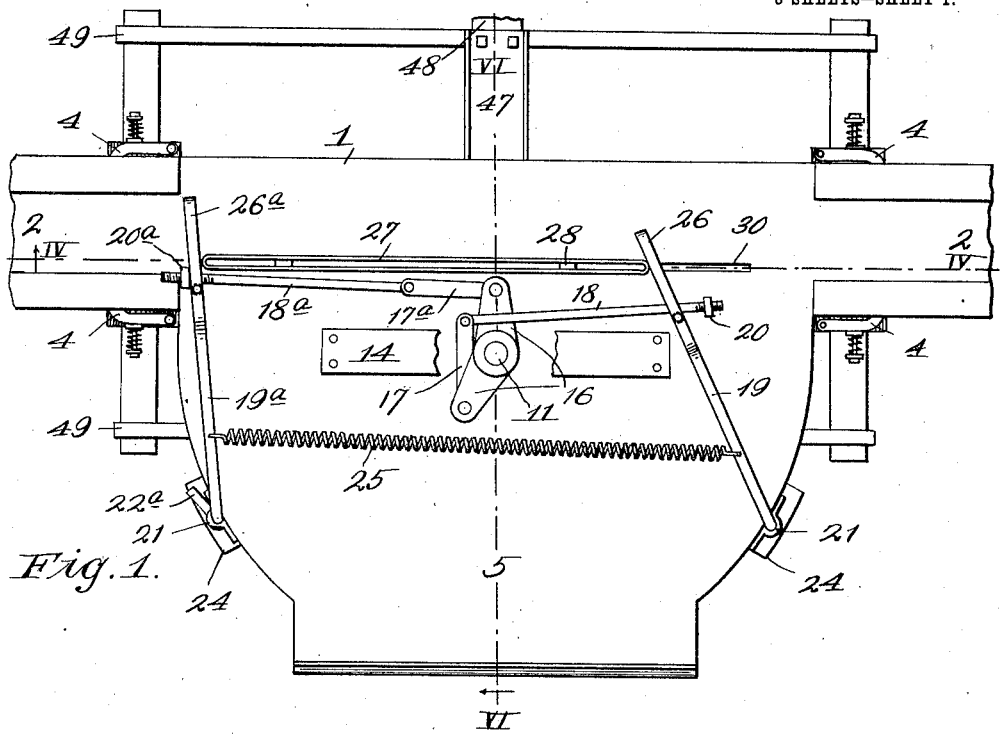
Figure 2:
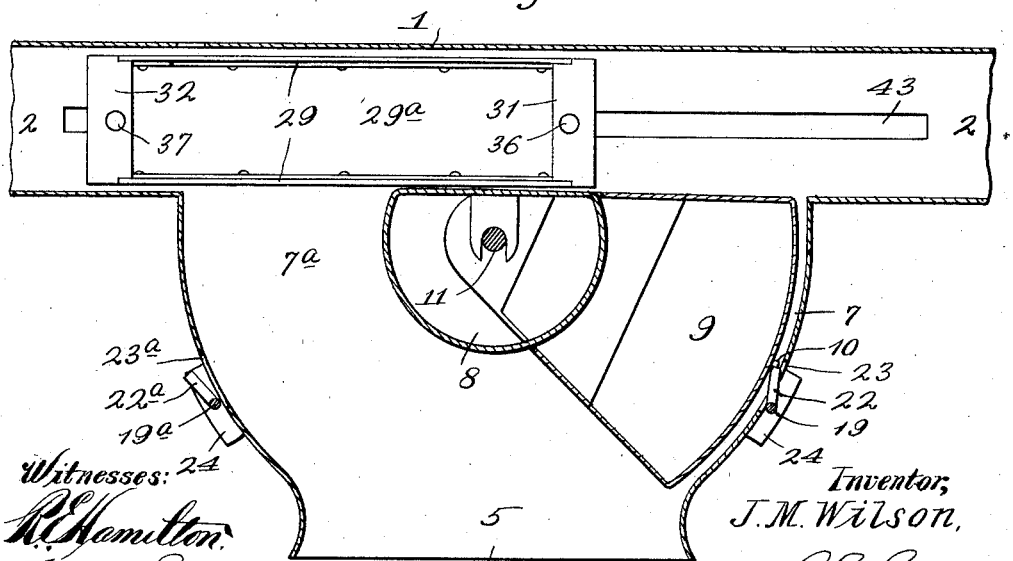

Other objects of the invention will hereinafter appear, and in order that said invention may be fully understood, reference will now be made to the accompanying drawings, in which:

Figure 1 is a plan view of my improved baling-press. Fig. 2 is a broken horizontal section of the baling-press on line II—II of Fig. 3, with some of the parts removed. Fig. 3 is a broken side elevation of the press. Fig. 4 is a broken longitudinal section on line IV—IV of Fig. 1, with some of the parts removed. Fig. 5 is a plan view of the gearing for driving the plunger. Fig. 6 is a cross section on line VI—VI of Fig. 1.

1 designates a baling-case provided at its ends with duplicate baling chambers 2, and tensioning devices 3. Said baling-case is also provided with duplicate sets of retainers 4, of ordinary or any preferred construction.

5 designates a horizontal hopper projecting laterally from the baling-case and having a feed-opening 6 at its front end for the reception of hay or other material to be baled. Hopper 5 has passageways 7 and 7ª, leading from feed-opening 6 to the baling-chambers 2, said passageways being formed by the sides of the hopper and a stationary drum 8 located therein.

9 designates an oscillatory feeder adapted to alternately sweep the charges of material into the baling-case 1, through the passageways 7 and 7ª. Said feeder is provided at its free end with a centrally disposed lug 10, and is fixed at its opposite end upon a vertical shaft 11, journaled in bearings 12 and 13 on the bottom of the hopper 5 and a channel-bar 14, respectively. Channel-bar 14 is carried by a pair of brackets 15, secured to the top of the hopper.

16 designates a bell-crank-lever fixed to the upper end of shaft 11 and pivotally-connected at its free ends to links 17 and 17ª, pivotally connected at their free ends to rods 18 and 18ª extending, respectively through the looped free ends of inverted L-shaped latch-bars 19 and 19ª and provided at their threaded outer ends with nuts 20 and 20ª, respectively, for actuating the latch-bars as will hereinafter appear. Latch-bars 19 and 19ª are pivoted in brackets 21 and provided at their lower portions with latch-members 22 and 22ª, adapted to move through slots 23 and 23ª, respectively, and engage lug 10 to lock feeder 9 in closed position, said latch-members being held in line with their respective slots by brackets 24 secured to adjacent portions of the hopper 5, 25 designates a retractile spring connected to the horizontal portions of the latch-bars to hold their looped ends 26 and 26ª in contact with the ends of a slide-bar 27, provided with a U-shaped member 28, depending into the path of plunger 29, through a longitudinal slot 30 in the top of the baling-case 1. Plunger 29 is reciprocally mounted in the baling-case, and is of hollow oblong shape to allow member 28 to extend therein into the path of the plunger-heads 31 and 32. Plunger 29 is reinforced by a central longitudinal partition 29ª.

33, 34, and 35 designate three eccentric gear-wheels for actuating the plunger, to the heads 31 and 32 of which said gears 33 and 35 are respectively connected by vertical shafts 36 and 37, journaled in said heads and provided with rollers 38 which traverse a pair of rails 39 at the under side of the baling-case to prevent lateral movement of the plunger. The eccentric gear-wheels have smooth peripheral portions 40 to relieve their teeth 41 of end thrust while said gears are in operation. The intermediate gear 34, which drives its companions, is fixed upon a vertical shaft 42, extending through a longitudinal slot 43 in the bottom of the baling-case and journaled in bearings 44 and 45, carried by channel-bars 46 and 47 supported, respectively, by hangers 48 and one of a pair of sills 49. Shaft 42 is driven by a large bevel gear-wheel 50, which in turn is driven by a pinion 51, fixed upon a horizontal shaft 52, journaled in bearings 44 and 53. Shaft 52 may be driven economically either by horse or engine power (not shown).

In practice the press is preferably mounted on wheels (not shown), so that it can be easily moved from place to place. Assuming that the parts are in the positions shown in the various views, when eccentric gear-wheel 34 is revolved it not only rotates gears 33 and 35, but moves the former bodily to the right (as indicated by dotted lines, Fig. 5), causing it through the intermediacy of shaft 36 to move plunger 29 to the right, which in turn carries eccentric gear-wheel 35 therewith and thus holds the same in proper relation to eccentric gear wheel 34. As plunger 29 travels to the right its head 32 engages member 28 and moves the same therewith, together with the sliding-bar 27, which, through the intermediacy of latch-bar 19, rod 18, nut 20, link 17, bell-crank-lever 16, and shaft 11, swings feeder 9 to the end of its left stroke or until it reaches the inner end of passageway 7ᵃ. As feeder 9 moves through its left stroke, it sweeps the charge of material previously deposited in the hopper, through passageways 7ᵃ and into the communicating baling-chamber. The feeder is then locked by latch-bar 19ᵃ until the plunger 29, returning on its left stroke passes, or almost passes, the discharge end of said passageway 7ᵃ, and hence it will be impossible for the charge of material to bulge back into the passageway. About the time the plunger passes said discharge end, plunger-head 31 engages member 28 and moves it and sliding-bar 27 back to the starting point. As sliding-bar 27 moves to the left it unlocks feeder 9 by moving latch-bar 19ᵃ to the left. As latch-bar 19ᵃ continues its movement to the left, after unlocking the feeeder, it engages nut 20ᵃ and through the intermediacy of rod 18ᵃ, link 17ᵃ, bell-crank-lever 16, and shaft 11, swings the feeder through passageway 7, causing it to sweep the charge in said passageway into the communicating baling-chamber. Feeder 9 is now locked at its starting point by latch-bar 19, which is drawn to the left by latch-bar 19ᵃ through the intermediacy of spring 25. When the eccentric gear-wheels 33, 34, and 35 reach the positions indicated by the dotted lines, Fig. 5, continued rotation of said gear-wheels causes the intermediate gear-wheels 34 to restore gear-wheels 33 and 35 to their initial positions, during which time gear-wheel 35 is the propeller of plunger 29 instead of gear-wheel 33. The foregoing operations are repeated until power is cut off from shaft 52.

While I have described the preferred form of my invention, I wish it to be understood that I do not limit myself to the exact construction shown and described, but reserve the right to make such changes as properly fall within the spirit and scope of the appended claims.

Having thus described my invention, what I claim and desire to secure by Letters Patent, is:

1. A baling-press consisting of a baling-case, a reciprocable plunger therein, a pair of shafts carried by said plunger, eccentric gears mounted on said shafts to travel with the plunger, and a relatively stationary intermediate eccentric gear for actuating the first-mentioned gears, said intermediate gear being mounted independently of the plunger.

2. A baling-press consisting of a baling-case having two baling-chambers, a hopper common to both baling chambers, a reciprocable plunger in said baling-case common to both baling-chambers, a pair of eccentric gear wheels carried by said plunger and provided with smooth peripheral portions, a relatively stationary intermediate eccentric gear-wheel for driving the first-mentioned eccentric gear-wheels, a driven shaft upon which the intermediate eccentric gear-wheel is mounted, and stationary bearings in which said shaft is journaled.

3. A baling-press having a baling-case with two baling-chambers, a hopper having a feed-opening and two passageways leading therefrom to the baling-chambers, a reciprocable plunger in the baling-case which alternately passes the discharge ends of said passageways, a feeder mounted in the hopper and adapted to alternately sweep through the passageways, means for locking said feeder at the end of each stroke and means in the path of the plunger, adapted to move longitudinally therewith, to unlock the feeder.

4. A baling-press consisting of a baling-case with two baling-chambers, a hopper having two passageways leading to said baling-chambers, an oscillatory feeder adapted to sweep through said passageways, a reciprocable plunger in the baling-case coacting with said feeder, latch-bars controlled by the plunger for locking said feeder at the end of each stroke and means connecting said latch-bars to cause the same to operate in unison.

5. A baling-press consisting of a baling-case with two baling-chambers, a hopper having two passageways leading to said baling-chambers, an oscillatory feeder adapted to sweep through said passageways, a reciprocable plunger in the baling-case co-acting with said feeder, latch-bars for locking said feeder at the end of each stroke, a sliding-member controlled by the plunger for releasing said latch-bars from the feeder, and yielding means for holding said latch-bars in engagement with said sliding-member and the plunger.

6. A baling-press consisting of a baling-case with two baling-chambers, a hopper having two passageways leading to said baling-chambers, an oscillatory feeder adapted to sweep through said passageways, a reciprocable plunger in the baling-case coacting with said feeder, U-shaped latch-bars pivotally mounted upon the hopper and adapted to lock said feeder at the end of each stroke, a sliding-member controlled by the plunger for actuating said latch-bars, and a spring for holding said latch-bars in engagement with said sliding-member.

7. A baling-press consisting of a baling-case with two baling-chambers, a hopper having two passageways leading to said baling-chambers, an oscillatory feeder mounted in said hopper and adapted to sweep through the passageways thereof, a reciprocable plunger in the baling-case, and a sliding-member actuated by said plunger to control the operation of said feeder.

8. A baling-press consisting of a baling-case with two baling-chambers, a hopper having two passageways leading to said baling-chambers, an oscillatory feeder mounted in said hopper and adapted to sweep through the passageways thereof, a reciprocable plunger in the baling-case, a sliding-member actuated by said plunger, a pair of bars actuated by said sliding-member, rods loosely connected to said bars, a bell-crank-lever loosely connected to said rods, and a shaft journaled in the hopper and keyed to said bell-crank-lever and the feeder.

9. A baling-press consisting of a baling-case with two baling-chambers, a hopper having two passageways leading to said baling-chambers, an oscillatory feeder mounted in said hopper and adapted to sweep through the passageways thereof, a reciprocable plunger in the baling-case, a bar slidably mounted upon the baling-case and actuated by said plunger, a pair of latch-bars controlled by said sliding-bar and adapted to lock the feeder at the end of each stroke, a shaft to which said feeder is fixed, and means interposed between said shaft and the latch-bars whereby the latter actuates the former.

10. A baling-press having a baling-case with two baling-chambers arranged centrally therein, a centrally-disposed hopper communicating with said baling-chambers, a reciprocable plunger in the baling-case, a relatively-stationary eccentric gear-wheel mounted beneath the baling-case intermediate the ends thereof, and two eccentric gear-wheels engaging opposite sides of the first-mentioned gear-wheel whereby they are driven and moved to and fro beneath the baling-case, and shafts connecting the two oppositely-disposed gear-wheels with the plunger so that the latter will be actuated by the former.

11. A baling-press having a baling-case with two baling-chambers, a reciprocable plunger in said baling-case, a hopper having two passage-ways communicating with the baling-chamber, an oscillatory feeder in the hopper controlled by the plunger and adapted to alternately close the openings between the passage-ways and the baling-chambers, two latches to alternately lock the feeder in closed position during the passage of the plunger past said openings, said latches being alternately actuated by the plunger to release the feeder, and means connecting said latches whereby when one latch releases said feeder, the other is thrown into position to engage the feeder.

12. A baling-press consisting of a baling-case with two baling-chambers, a hopper having two passageways leading to said baling-chambers, an oscillatory feeder adapted to sweep through said passageways, a centrally-disposed member on the free end of said feeder, a reciprocable plunger in the baling-case coacting with said feeder, locking means adapted to alternately engage said centrally-disposed member to lock the feeder at the end of each stroke, and means actuated by the plunger to alternately release said locking means from the centrally-disposed member.

13. A baling-press consisting of a baling-case with two baling-chambers, a hopper having two passageways leading to said baling-chambers, an oscillatory feeder adapted to sweep through said passageways, two latches to alternately lock said feeder at the end of each stroke, a spring connecting said latches to alternately throw each into engagement with the feeder, and a reciprocable plunger in the baling-case operably-connected to the feeder and adapted to alternately disengage the latches from said feeder.

14. A baling-press consisting of a baling-case with two baling-chambers, a hopper having two passageways leading to said baling-chambers, a shaft journaled in said hopper, an oscillatory feeder fixed to said shaft and adapted to sweep through the passageways, a reciprocable plunger in the baling-case, and means controlled by said plunger at opposite sides of the shaft to oscillate the same, said means being loosely-connected to the shaft, so that they may be alternately moved a certain distance by the plunger before actuating said shaft, to the end that the plunger may move a certain distance throughout each stroke while the feeder remains at rest.

In testimony whereof I affix my signature, in the presence of two witnesses.

JOHN M. WILSON.

Witnesses:
P. J. CONKLIN,
SILAS S. BROWN.

Copies of this patent may be obtained for five cents each, by addressing the "Commissioner of Patents, Washington, D. C."